United States Patent
Noked

(10) Patent No.: US 9,826,427 B2
(45) Date of Patent: Nov. 21, 2017

(54) SYSTEM AND METHOD FOR DYNAMIC OPERATIONAL DECISION MAKING IN MULTI TYPES/LAYERS WIRELESS RADIO ACCESS NETWORKS BASED ON PROGRESSIVE DATA FLOW DETECTION

(71) Applicant: Avgar Noked, Kfar Sava (IL)

(72) Inventor: Avgar Noked, Kfar Sava (IL)

(73) Assignee: Avgar NOKED, Kfar Sava (IL)

( * ) Notice: Subject to any disclaimer, the term of this patent is extended or adjusted under 35 U.S.C. 154(b) by 16 days.

(21) Appl. No.: 14/785,858

(22) PCT Filed: Apr. 23, 2014

(86) PCT No.: PCT/IB2014/060937
§ 371 (c)(1),
(2) Date: Oct. 21, 2015

(87) PCT Pub. No.: WO2014/174458
PCT Pub. Date: Oct. 30, 2014

(65) Prior Publication Data
US 2016/0277958 A1  Sep. 22, 2016

Related U.S. Application Data

(60) Provisional application No. 61/814,841, filed on Apr. 23, 2013.

(51) Int. Cl.
*H04W 28/02* (2009.01)
*H04W 24/02* (2009.01)
*H04W 24/08* (2009.01)

(52) U.S. Cl.
CPC ....... *H04W 28/0226* (2013.01); *H04W 24/02* (2013.01); *H04W 24/08* (2013.01); *H04W 28/0215* (2013.01); *H04W 28/0268* (2013.01)

(58) Field of Classification Search
CPC ......... H04W 28/0226; H04W 28/0268; H04W 28/0215
See application file for complete search history.

(56) References Cited

U.S. PATENT DOCUMENTS

| | | | |
|---|---|---|---|
| 2008/0108378 A1* | 5/2008 | Gessner | H04W 88/08 455/513 |
| 2008/0225708 A1* | 9/2008 | Lange | H04L 47/10 370/230 |
| 2009/0180447 A1* | 7/2009 | Kim | H04W 24/10 370/338 |

* cited by examiner

Primary Examiner — Jamal Javaid
(74) Attorney, Agent, or Firm — Henry M. Sinai; IP-Partnership

(57) ABSTRACT

The present invention is directed to a system and method for a dynamic and automatic decision making process related to the ongoing operation of multi-technology, multi-vendor wireless radio access and core networks. based on progressive data flow detection. The method comprises the steps of receiving network data files from the networks, the data files including data from the network and from the multiplicity of mobile users; extracting the operational related data from the data files; analyzing the performance of the data flow from the related operational data for the multiplicity of mobile users; generating and executing modified mobility data transcript files for the access and core networks with the modified data transcript files, to perform modifications to the operational networks and verifying and analyzing the quality of service and performance state of the networks and the multiplicity of mobile users after implementing the executional changes.

14 Claims, 3 Drawing Sheets

SYSTEM AND METHOD FOR DYNAMIC OPERATIONAL DECISION MAKING IN MULTI TYPES/LAYERS WIRELESS RADIO ACCESS NETWORKS BASED ON PROGRESSIVE DATA FLOW DETECTION

CROSS REFERENCE TO RELATED APPLICATIONS

This application is a U.S. National Phase Application under 35 U.S.C. 371 of PCT International Application No. PCT/IB2014/060937, which has an international filing date of Apr. 23, 2014, and which claims priority from U.S. Provisional Patent Application No. 61/814,841 filed Apr. 23, 2013, all of which are incorporated herein by reference in their entirety.

FIELD OF THE INVENTION

The present invention is related to dynamic decision making in multi technology, multi-vendor wireless radio access networks. More particularly, the invention relates to an on-line construction of dynamic decision making based on progressive data flow via continuous software for monitoring, management and control of core and radio wireless telecommunication networks under operation.

BACKGROUND OF THE INVENTION

Decision-making is one of the key elements in every operation of telecom networks. Daily Operational activates perform by the wireless licensed operators are key stone in maintaining network's grade of service and customer satisfaction. The technological progress and the a range of different co exiting radio access technologies and wireless infrastructure vendor's product as well as the increase ramification of the wireless communication networks makes operation and engineering planning decision very complex and multi-dimensional. In addition, the increase in demand for affordable mobile broadband connectivity and data traffic driving the need for centralized operational actions base on comprehensive and progressive data flow detection. This can be generated by a software based decision support system. Taking the necessary decision in the right time using software based multi-layer progressive data flow detection algorithms allow the operator to maximize it networks infrastructure to allow better service and all by reducing the operational cost of each network.

In a typical mobile radio system, Base Stations (BSs) and mobile User Equipment units (UEs) communicate with voice and data signals via a Radio Access Network (RAN) to one or more core networks. BSs are typically mobile base stations, which consist of transceivers and antennas. BS has different type of physical and logical dimensions, for example macro, micro, femto BS and Small cell. The mobile UEs are mobile devices, such as mobile telephones, PDAs, tablets and laptops with mobile termination. The core network is the central part of a telecom network that provides various services to customers who are connected to it.

The RAN covers a geographical area, which is divided into cells, each of which is served by a base station. A cell area is a geographical area, in which radio coverage is provided by the radio equipment in the corresponding base station. Each cell is identified by a unique identity, which is broadcasted by the cell. The base station communicates over the air interface (e.g., using radio frequencies) with the mobile UEs within the cell area. In typical RANs, several base stations are typically connected (e.g., by landlines or microwave channels) to a Radio Network Controller (RNC). The RNC (also known as a Base Station Controller) supervises and coordinates various activities of the plurality of base stations connected to it. The RNCs are typically connected to one or more core networks.

The LTE and LTE-A are the Universal Mobile Telecommunications Systems (UMTS) Long Term Evolution, which are standard for wireless communication of high-speed data for mobile phones and data terminals. It is based on the GSM/EDGE and UMTS/HSPA network technologies, for increasing the capacity and speed using new modulation techniques. This standard is developed by the 3GPP (3rd Generation Partnership Project). The Universal Mobile Telecommunications System (UMTS) is a third generation mobile communication system, which evolved from the Global System for Mobile Communications (GSM), and is intended to provide improved mobile communication services, based on Wideband Code Division Multiple Access (WCDMA) technology. Code division multiple access-based systems use a wider frequency band to achieve the same rate of transmission as FDMA (Frequency-Division Multiple Access. In a forum known as the Third Generation Partnership Project (3GPP), telecommunications suppliers proposed and agreed upon standards for third generation networks and Universal Terrestrial Radio Access Network (UTRAN) specifically. The UTRAN contains mobile base stations (also known as Node Bs and e-Node Bs) and Radio Network Controllers (RNCs) and e-RNC. The RNC provides control functionalities for one or more Node Bs/e-NodeBs. Node B contains radio frequency transmitters and receivers used to communicate directly with the mobile UEs, which move freely around it. In this type of mobile network, the mobile UEs cannot communicate directly with each other but have to communicate with the Node B.

In recent years, mobile networks have become more and more complex. As a result, there is a need for a simple and automated Operation and Maintenance (O&M) system. In order to decrease management costs, to use hardware in the most effective way, and to maximize the spectrum efficiency (which is typically a limited resource), mobile networks are adapted to produce real-time event messages. An event message is a measurement report sent between different components in the mobile network (such as eNBs E-UTRAN Node B, RNC, Node B, UE, for example). Event messages can be categorized to several types, depending on the types of measurements encapsulated within them, and on the network components participating in the messaging process.

Wi-Fi internet networks or Wi-Fi hot spot networks are refers to wireless networking technology that allows computers and other devices to communicate over a wireless signal. It describes all network components that are based on one of the 802.11 standards, including 802.11a, 802.11b, 802.11g, and 802.11n. These standards were developed by the IEEE and adopted by the Wi-Fi Alliance, which trademarked the name "Wi-Fi""

In addition, technological standard organizations such as the 3GPP forum, investigated enhanced ways to control and manage the operation of third generation networks with advance measurement. One result of the forum's work is the UTRAN Iur interface Radio Network Subsystem Application Part (RNSAP) signaling, as described in 3GPP TS 25.423 V3.14.2 (2012), for example. This standard specifies the radio network layer signaling procedures of the control plane between RNCs in UTRAN, in which the transmitted frequency use and power are ones of those measurements.

The 3GPP forum, also selected Local IP Access and Selected IP Traffic Offload (LIPA-SIPTO) as describe in 3GPP TR 23.829 as a method to offload traffic from a wireless communication system operator's core network to a defined IP network that is close to a point of attachment to the access point of a wireless transmit receive unit (WTRU). When reference is made to a core network with respect to the data plane, the nodes under consideration include the serving gateway (SGW) and the packet data network gateway (PDW) in, for example, a long term evolution (LTE) compliant system, or the serving general packet radio service (GPRS) support node (SGSN) and gateway GPRS support node (GGSN) in a universal mobile telephone system (UMTS) terrestrial radio access network (UTRAN), although the disclosure herein is not limited to any one network architecture or technology. The designation of SIPTO is to offload some of the IP traffic from traversing these nodes.

Pre-requisite to a dynamic operational decision making is to have a comprehensive data view of all related wireless radio access element. Due to the dynamic nature of the wireless network and the variance use of network's resources at any given geographical time and location, there is a need to perform decision as close as possible to close to the data the operation of any type of RF technology based mobile network. In addition, obtaining the proper permits is the first step in the construction of an outdoor mobile base station. Mobile operators wishing to build such an infrastructure installation must apply for a special-use building permit. This permit allows a structure to meet the local municipality building criteria and to meet the environmental ordinances of the local municipality. Applications for such permits are submitted to the municipal planning board and generally require the approval of the town council, or another local board, at a public meeting.

Today, wireless radio networks operators are looking for ways for dynamically react to the non-heterogeneous, multi-layer network resources demands by their customers. However, such actions present many technical challenges and difficulties. None of the currently available techniques can provide a dynamic solution for multi, mobile and wireless internet, networks satisfying solution to the problem of managing, controlling and ensuring dynamic implementation of network changes in order to assure total operation cost efficiency and comprehensive user grade of service. Therefore, there is a need for a system that provides a continuous and dynamic monitoring and automated decision making execution capabilities for the mobile and wireless internet operators' network elements (core and radio), which allows accurate measurement of network element from multi type/technologies/layer and vendors, in real time.

It is therefore an object of the present invention to provide a software system for automatically and continuously managing the dynamic decision making as well as transferring the decisions into mobility changes.

Another object of the present invention is to provide a system for guaranteeing that mobile network operator, which be able to continuously maintain its network's grade of service and at any given time and location.

A further object of the present invention is to accurately pre-detect and thus prevent during the mobile network planning and deployment stage any mobile operators' possible negative network performance effect at the wireless radio access network of its kind as well as at the core network.

Yet another object of the present invention is to accurately and remotely detect any mobile operators' noncompliance, violations and anomalies at mobile sites.

The system proposed by the present invention can provide seamless integration between different sources of data, from several network infrastructure vendors (such as ZTE, HUA-WEI, Ericsson, NOKIA-NSN, Alcatel, and Motorola for example).

Yet another object of the present invention is to provide a cost-effective system for detecting network resource starvation.

Other objects and advantages of the invention will become apparent as the description proceeds.

SUMMARY OF THE INVENTION

The present invention is directed to software based system for dynamic operational decision-making based on continuous analysis of wireless network's event measurement and statistical data obtained from multi-radio, access technologies and core network elements, which comprises:

An online software processing element, for data collection and gathering information on the multi type mobile radio access and core network as well as internet wireless access network element, which will enable data decision process under the same platform. The data gathered would be the base for ongoing decisions for example for improving customer grade of service, network balancing and operational cost reduction and more, a data collection and verification server, connected to the software, for verifying and analyzing the network data gathered before implementing the decision making algorithms, wherein the data collection and verification server is; and a variance and short term progressive data flow decision generator, for receiving the compared BS and AP data from the software, and for generating a variance of recommendation for network modifications data file.

A variance and sort (micro)/long (macro) term progressive data flow decision generator, for receiving the compared BS and AP data from the software, and for generating a variance of recommendation for network modifications data file.

The software processing element receives data files from multi-vendor, multi technology mobile radio access, core, internet wireless access network elements sources and extracts the grade of service and other operational related data from the network's data files. The variance files are utilized for better managing and controlling the mobile core, access network, and for automatic decision making and decision execution process.

The BS and the radiation sources may be wireless radio telecommunication non-ionizing radiation sources. The software processing unit may process and analyze the mobile network's and multiplicity of mobile users' data of each mobile core, access network and generate micro and macro layer decisions and executional changes to be implemented back into the operational network to support better mobile's user performance and better traffic capacity handling and quality of service. The software processing unit may comprise:

a data manager, for extracting the relevant data from the network's data files;

a customer device overlay verification for aliening the related data from the different networks and different network layer elements with the short and long term progressive data flow generators; and A decision making elements construction generator, for constructing the element related to the operation's performance, essentially in real time or close to real time.

The software data manager extracts, for example, the frequency spectrum use data, Network's Quality of Service data class performance and other data related to traffic and radio and core engineering of each network elements. It may encompass one or more decoders, adapted to analyze the data files received from the BS, core and other internet wireless network elements, in parallel.

A multi-point, multi technology and multi-mobile networks monitoring and measurement capabilities may be enabled via a single software monitoring and management system.

Software managed national mobile network spectral data may be used within large geographical area.

Mobile network and internet wireless network operational and in-plan activates may be collected, measured monitored and managed under one centralized system.

Real measurement may be transformed into multiple location mobile and internet's operational management centers.

Software based short term progressive data flow generator based on network element automated analysis will take place remotely on multiple site location or a plurality of network layer, technologies and elements, which will dramatically reduce the operational time for analyzing separate data and for a reduction of operational performance costs.

The data files may be, for example, XML data files that comprise real-time event messages, transferred between components in the monitored radio, core and internet radio wireless elements.

There is thus provided, in accordance with an embodiment of the invention, a system for making dynamic operational decisions related to multi technology, multi-vendor in wireless radio access and core networks, the networks having a multiplicity of mobile users. The system includes a processing unit for receiving data files from the access and core networks and for extracting and analyzing operation related data from the data files; a short term (micro) progressive data flow decision generator, connected to the processing unit, for analyzing and generating micro layer executional decisions based on the mobile traffic activity of the networks and multiplicity of users; a long term (macro) progressive data flow decision generator, connected to the processing unit, for receiving and comparing Base Station (BS) data and user mobility data and for generating macro layer executional decisions based on the mobile traffic activity; and a data transcript execution planner connected to the processing unit for generating new data transcript files based on the generated micro and macro executional decisions, wherein the connectivity state of the network and multiplicity of users of the access and core networks are modified by the connectivity state of the new data transcript files, thereby to perform modifications to the multiplicity of user's mobile under different operational access networks.

In addition, there is also provided, in accordance with an embodiment of the invention, a method for making dynamic operational decisions related to multi technology, multi-vendor, wireless radio access and core networks, the networks having a multiplicity of mobile users. The method includes the steps of: receiving network data files from the access and core networks, the network data files includes data from the network and from the multiplicity of mobile users; extracting the operational related data from the data files; analyzing the performance of the data flow from the related operational data for the multiplicity of mobile users; generating and executing modified mobility data transcript files for the access and core networks with the modified data transcript files, thereby to perform modifications to the operational networks; and verifying and analyzing the quality of service and performance state of the networks and the multiplicity of mobile users after implementing the executional changes.

Furthermore, in accordance with an embodiment of the invention, the set step of analyzing includes the steps of analyzing the short term and/or long term performance data flow from the related operational data.

Furthermore, in accordance with an embodiment of the invention, the modified data transcript files are configured to perform short term and/or long term modifications to the operational networks.

BRIEF DESCRIPTION OF THE DRAWINGS

The above and other characteristics and advantages of the invention will be better understood through the following illustrative and non-limitative detailed description of embodiments thereof, with reference to the appended drawings, wherein.

DESCRIPTION OF THE INVENTION

In the following description, for the purpose of illustration, numerous specific details are provided. As will be apparent to the skilled person, however, the invention is not limited to such specific details and the skilled person will be able to devise alternative arrangements.

The key idea proposed by the present invention is to dynamically and automatically perform decision making process related to the ongoing operation of multi technology, multi-vendor wireless radio access and core networks. On-going operational execution and implementation activity based on the decisions process, is designed to assure superior operational activity of both mobile and wireless internet network under the same operation. The system proposed by the present invention is capable of transforming raw data from several mobile and wireless internet (Wi-Fi) networks into a form of ongoing online operational decision making template that will automate and efficiently manage the decision making process and execution follow up process perform by the engineering and operation personnel of the mobile and wireless internet (Wi-Fi) networks operators. It can detect online mobile network behavior, quality and capacity bottle necks, non-optimal operational modifications, analyze them via adjustable decision making algorithms and enable the networks' operators to implement on-going network modification actions, essentially in real-time. Each controller element in the core and radio access of a mobile and wireless internet (Wi-Fi) network executes live relevant measurement for controlling and managing its functionality. The system proposed by the present invention uses those accurate controller elements and measurements and performs analysis and decision making process, in order to achieve superior network performance is a variable and un limited set of network performance parameters. The present invention proposed a method for transforming real measurement into an operational execution list based on variant multi-layer algorithms designed to address performance criteria of parallel multi-layer heterogeneous networks.

Figure 1:
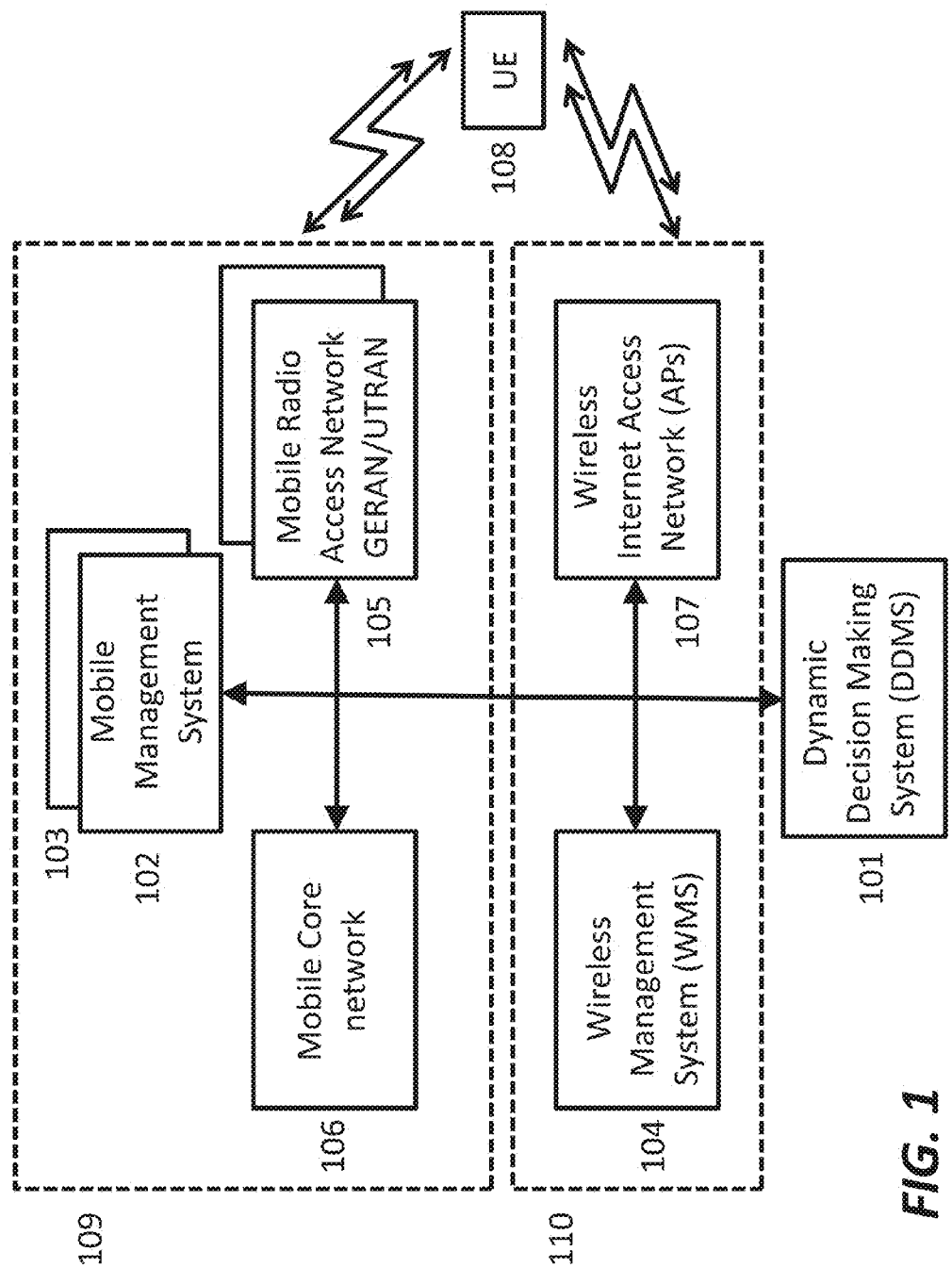
FIG. 1 is a high level schematic illustration of a combine mobile and internet wireless radio networks, an on-line decision making system, constructed and operated in accordance with one embodiment of the present invention.

FIG. 1 is a high level schematic illustration of an on-line Dynamic Operational Decision Making System (DDMS), constructed and operative in accordance with an embodiment of the present invention. The Dynamic Operational Decision Making System (DDMS) 101 is the mobile and wireless internet (Wi-Fi) operation system, which interfaces with the existing Mobile Operation Support Subsystems (OSS) 102 and to the wireless internet management network-gateways/firewalls (WMN) 104.

The Mobile Operation Support Subsystems (OSS) 102 is connected to the mobile core (106) and Radio Access Network (RAN) 105. The Wireless Internet Management System-gateways/firewalls (WLMS) 103 is connected the Wireless Access Network (WLAN) 107. Both the Mobile Radio Access Network (RAN) 104 and Wireless Access Network (WLAN) 107 are the network's interfaces to the Mobile and Internet User Equipment (UE) 108. The Dynamic Operational Decision Making System (DDMS) 101 interfaces and operates with one or more mobile network operators support subsystems 102-103. The DDMS can be directly connected to the mobile networks operators support subsystems 102-103 and/or through several Wireless Internet Management System-gateways/firewalls (WLMS) 103. The connection interface between the mobile network, interment wireless network and the DDMS is via the internet protocol connection (IP) Interface. Each mobile access network 103, 105, 106 consists of one or more Gateways/controllers (S-GW/RNC/NMC) 109, variety list of BS (Macro, Micro, DAS and Femto), which carry the configuration and other performance measurements data of the BS, NB (Node B) and eNB (extended Node B) 106 and the UE (User Equipment unit) 107.

The system proposed by the present invention 101, is connected to the Mobile network's Gateways/Controllers (S-GW/RNC/NMC) 109. The present invention comprises of software modules, which continuously performing operational decision making based on data monitoring and progressive data flow analyzing the information transfer from the Mobile network (MN) 109 and Wireless Internet Network (WIN) 110 and allowing implementation of online operational decisions in parallel trough both the OSS 102-103 and the WMS 104.

Figure 2:
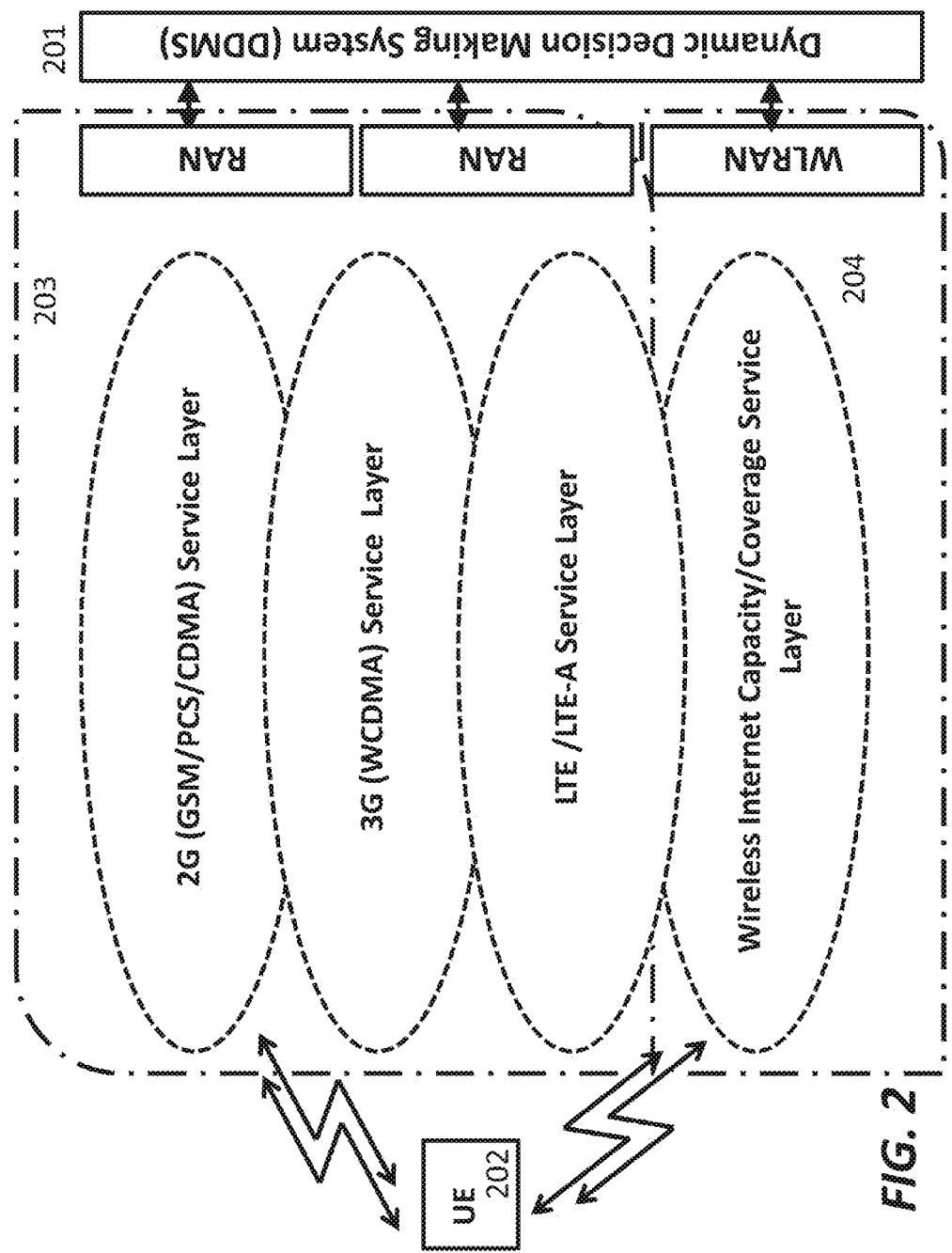
FIG. 2 is a high level schematic illustration of the seamless mobility between the variety of mobile networks layer and the Wi-Fi internet network systems.

FIG. 2 is a is a high level schematic illustration of the seamless mobility of mobile user equipment (UE) 202 between the different Mobile Network (MN) 203 and Wireless Internet Wi-Fi (WIN) 204 network's service layer. The UE activity measurements are monitored and progressive data flow by the Dynamic Operational Decision Making System (DDMS) 201 for improved UE service and better operational performance. The Mobile network's internal mobility interaction take place, for example, between the 2G/3G/LTE layers and an external mobility interaction take place between the different Mobile network layers, for example 3G or LTE and the Wireless Internet Wi-Fi (WIN) 204 network's service layer.

The Mobile Network (MN) 203 is constructed, but not limited, from several types of BS such as Macro, Micro, DAS and Femto but not while the Wireless Internet Wi-Fi (WIN) 204 network's service layer is constructed, among others form Radio Access Points (AP). The Mobile and Wireless Internet radio access element may be, in some cases, physically unified under the same geographical positioning location of by the same physical hardware.

Figure 3:
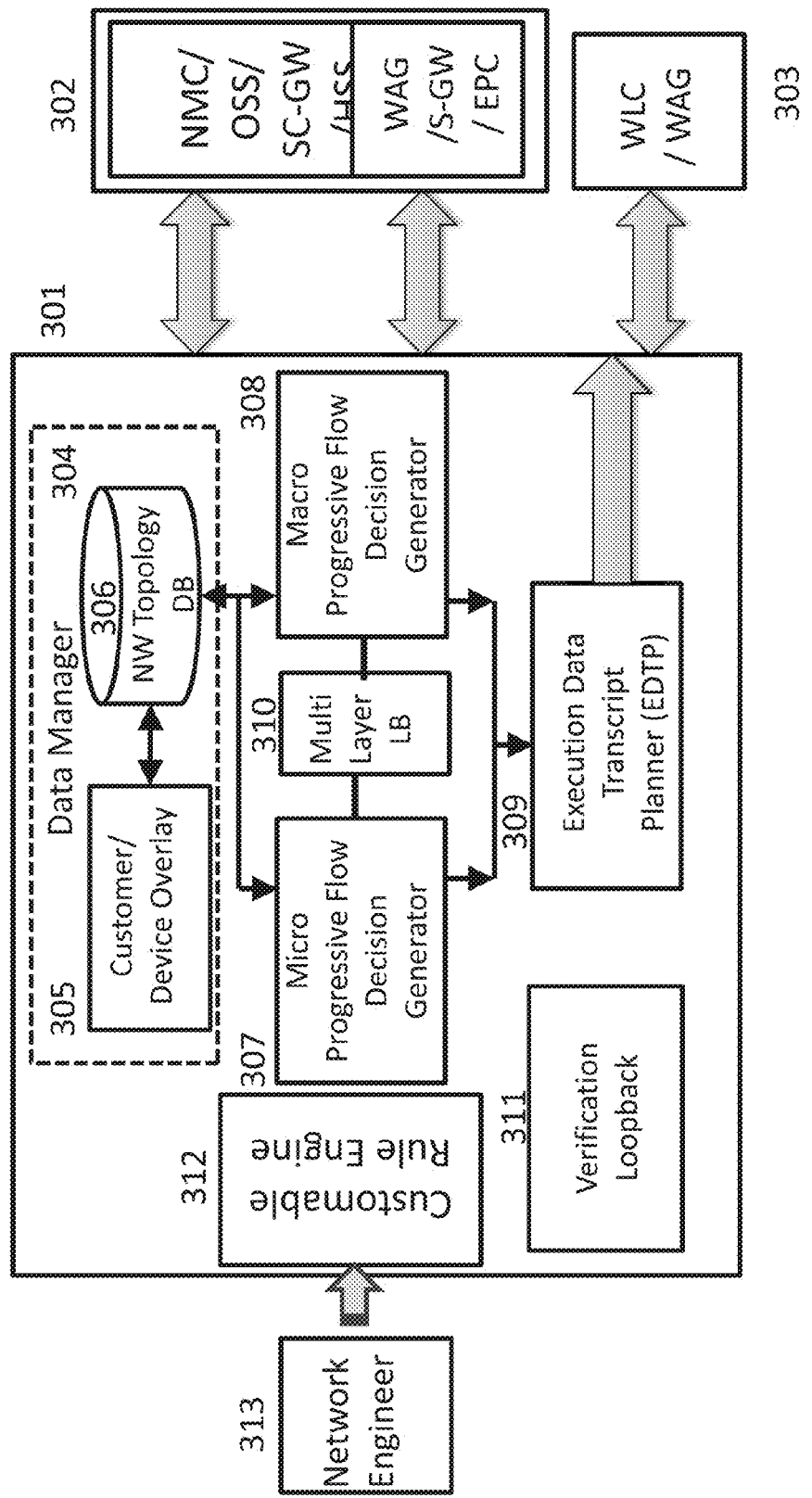
FIG. 3 is a schematic block diagram of one exemplary embodiment of the decision making part of the present invention.

FIG. 3 is a schematic block diagram of one exemplary embodiment of the dynamic data collection and decision making and execution part, according to the present invention. The software system 301 continuously monitors, analyzes and generates short (micro) and long (macro) term operational decisions to improve UE grade of service and operational efficiency.

In this embodiment, the system 301 receives data files from the NMC/OSS/SC-GW/HSS and WAG/S-GW/EPC 302 and from the WLC/WAG 303, collects and gathers traffic/performance data on each BS/AP in the mobile system. According to this embodiment, the software in the Data Manager Unit (DM) unit 304 receives XML and other formats of data files and configuration files from NMC/OSS/SC-GW/HSS and WAG/S-GW/EPC 302 and the WLC/WAG 303, verifies and extracts from them the grade of service and other operational' related data, creates the Customer Device Overlay Layer (CDOL) 305 and set them in the local Database (DB) 306.

The Local Database (DB) contains NW Topology data from the different radio technology networks as well as active mobility data information. The Data Manager software processing and database unit 304 extracts, verify and index the collected data into the database so that the data will be then processed by the Short Term (Micro) Progressive data flow Decision Generator (STPDG) 307 and in parallel, by the Long Term (Macro) Progressive data flow Decision Generator (LTPDG) 308. The Multi-Layer Load Balancer (MLLB) 310 is connected to both Short Term (Micro) Progressive data flow Decision Generator (STTDG) and the Long Term (Macro) Progressive data flow Decision Generator (LTTDG) 308 in order to add Multi-Layer Load Balancing data inputs to any Generated Decision. Generated Decisions are then shifted to the Data Transcript Execution Planner (DTEP) 309 to generate the new data transcript files that will be implemented back in the NMC/OSS/SC-GW/HSS and WAG/S-GW/EPC 302 and/or in the WLC/WAG 303.

The system also contains Verification Loopback (VL) 311 element in order to verify and assess the Micro and Macro Progressive Flow Decision Generators in order to maintain Mobile's quality of Service. All System's element contains interfaces with the Customable Rule Engine (CRE) 312 in order to enable Operator's rules setting. Those setting can be implemented by the operator's Network Engineer (NE) 313 or any operator's authorize personnel The above examples and description have been provided only for the purpose of illustration, and are not intended to limit the invention in any way. As will be appreciated by the skilled person, the invention can be carried out in a great variety of ways, employing more than one technique from those described above, all without exceeding the scope of the invention.

It will be appreciated that the present invention is not limited by what has been described hereinabove and that numerous modifications, all of which fall within the scope of the present invention, exist. Rather the scope of the invention is defined by the claims, which follow:

The invention claimed is:

1. A system for making dynamic operational decisions related to multi technology, multi-vendor in wireless radio access and core networks, said networks having a multiplicity of mobile users, the system comprising:

a hardware processor configured to perform a predefined set of basic operations in response to receiving a corresponding basic instruction selected from a predefined native instruction set of codes;
    a data management unit in communication with said hardware processor and said access and core networks, comprising a first set of machine codes selected from the native instruction set for receiving data files from said access and core networks and for extracting and analyzing data from said data files;
    a short term (micro) progressive data flow decision generator, in communication with said hardware processor, comprising a second set of machine codes selected from the native instruction set for analyzing and generating micro layer executional decisions based on the mobile traffic activity of said networks and multiplicity of users; and
    a long term (macro) progressive data flow decision generator, in communication with said hardware processor, comprising a third set of machine codes selected from the native instruction set for receiving and comparing Base Station (BS) data and user mobility data and for generating macro layer executional decisions based on said mobile traffic activity;
    a data transcript execution planner in communication with said hardware processor, comprising a fourth set of machine codes selected from the native instruction set for generating new data transcript files based on said generated micro and macro executional decisions, wherein the connectivity state of the network and multiplicity of users of said access and core networks are modified by the connectivity state of the new data transcript files, thereby to perform modifications to the multiplicity of mobile users under different operational access networks;
    a multi-layer load balancer in communication with said short term and said long term progressive data flow decision generators and in communication with said hardware processor, comprising a fifth set of machine codes selected from the native instruction set in order to add multi-layer load balancing data inputs to generated decisions; and
    a verification loopback element in communication with said hardware processor, comprising a sixth set of machine codes selected from the native instruction set for verifying the new data transcript files and assessing changes in the operational networks, due to the new data transcript files changes;
    wherein said access and core networks include any of a group including wireless, internet gateways, firewalls and management systems.

2. The system according to claim 1, in which said micro and macro progressive data flow decision generators are operable for mobile and wireless internet network data within a large geographical area.

3. The system according to claim 1, in which said micro and macro progressive data flow decision generators are automated and managed under a centralized system.

4. The system according to claim 1, in which the processing unit processes and analyzes operational parameters in real-time or close to real time.

5. A method for making dynamic operational decisions related to multi technology, multi-vendor, wireless radio access and core networks, said networks having a multiplicity of mobile users, the method comprising the steps of:
    receiving network data files from said access and core networks, said network data files comprising data from the network and from the multiplicity of mobile users;
    extracting the operational related data from said data files;
    analyzing the performance of the data flow from said related operational data for the multiplicity of mobile users;
    generating and executing modified mobility data transcript files for the access and core networks with the modified data transcript files, thereby to perform modifications to the operational networks; and
    verifying and analyzing the quality of service and performance state of the networks and the multiplicity of mobile users after implementing the executional changes;
    wherein said steps of receiving, extracting and analyzing are automated and configured to take place within a predetermined period of time.

6. The method of claim 5, wherein said set step of analyzing comprises the step of:
    analyzing the short term performance data flow from said related operational data.

7. The method of claim 5, wherein said set step of analyzing further comprises the step of:
    analyzing the long term performance data flow from said related operational data.

8. The method of claim 6, wherein said modified data transcript files are configured to perform short term modifications to the operational networks.

9. The method of claim 7, wherein said modified data transcript files are configured to perform long term modifications to the operational networks.

10. The method of claim 5, further comprising the steps of:
    verifying the performance based on the modified data transcript files of the networks and multiplicity of mobile users; and
    assessing changes in the quality of service of the operational networks, due to the modified data transcript files.

11. The method of claim 6, wherein said steps of generating and executing new data transcript files are automated and configured to take place within a predetermined period of time after said automated steps of receiving, extracting and analyzing.

12. The method of claim 11, further comprising the step of:
    creating a historical database for storing details of the networks' operations and topologies; and
    utilizing the data in the historical database for identifying any of a group of events including network malfunctioning, abnormal operation; operational patterns and behaviors of mobile and wireless internet networks.

13. The method of claim 12, further comprising the steps of:
    storing subscriber details in said historical database; and
    extracting information from said subscriber details for use by network.

14. A system for making dynamic operational decisions related to multi technology, multi-vendor in wireless radio access and core networks, said networks having a multiplicity of mobile users, the system comprising:
    a hardware processor configured to perform a predefined set of basic operations in response to receiving a corresponding basic instruction selected from a predefined native instruction set of codes;

a data management unit in communication with said hardware processor and said access and core networks, comprising a first set of machine codes selected from the native instruction set for receiving data files from said access and core networks and for extracting and analyzing data from said data files;

a short term (micro) progressive data flow decision generator, in communication with said hardware processor, comprising a second set of machine codes selected from the native instruction set for analyzing and generating micro layer executional decisions based on the mobile traffic activity of said networks and multiplicity of users; and a long term (macro) progressive data flow decision generator, in communication with said hardware processor, comprising a third set of machine codes selected from the native instruction set for receiving and comparing Base Station (BS) data and user mobility data and for generating macro layer executional decisions based on said mobile traffic activity; and a data transcript execution planner in communication with said hardware processor, comprising a fourth set of machine codes selected from the native instruction set for generating new data transcript files based on said generated micro and macro executional decisions, wherein the connectivity state of the network and multiplicity of users of said access and core networks are modified by the connectivity state of the new data transcript files, thereby to perform modifications to the multiplicity of mobile users under different operational access networks; and a customable rule engine in communication with said with said hardware processor, comprising a seventh set of machine codes selected from the native instruction set to enable an operator to determine definitions and thresholds for the micro and macro layer progressive decision generators;

wherein said wireless system comprises Base Station (BS) and Access Point (AP) elements.

\* \* \* \* \*